(12) United States Patent
Uchida et al.

(10) Patent No.: US 6,597,869 B2
(45) Date of Patent: Jul. 22, 2003

(54) IMAGE PICKUP APPARATUS PROVIDED WITH A FLASH DEVICE

(75) Inventors: Mitsuhiro Uchida, Kanagawa (JP); Yuji Kume, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/189,492

(22) Filed: Jul. 8, 2002

(65) Prior Publication Data

US 2003/0007800 A1 Jan. 9, 2003

(30) Foreign Application Priority Data

Jul. 9, 2001 (JP) ........................................ 2001-207855

(51) Int. Cl.[7] .............................................. G03B 15/03
(52) U.S. Cl. ........................ 396/155; 396/225; 396/322
(58) Field of Search ................................. 396/225, 155, 396/154, 213, 322, 263, 265, 391, 176; 348/370, 371, 360, 361

(56) References Cited

U.S. PATENT DOCUMENTS

| | | | |
|---|---|---|---|
| 3,580,149 A | * | 5/1971 | Fujisawa .................... 396/225 |
| 5,485,201 A | | 1/1996 | Aoki et al. |
| 5,550,587 A | * | 8/1996 | Miyadera ................ 396/155 X |
| 5,712,535 A | | 1/1998 | Ogawa |
| 5,838,369 A | | 11/1998 | Aoki et al. |
| 5,896,014 A | | 4/1999 | Ogawa et al. |
| 5,909,245 A | | 6/1999 | Aoki et al. |
| 5,978,022 A | | 11/1999 | Aoki et al. |
| 6,072,281 A | | 6/2000 | Ogawa |
| 6,081,076 A | | 6/2000 | Ogawa |

FOREIGN PATENT DOCUMENTS

| | | |
|---|---|---|
| JP | 6-308586 | 11/1994 |
| JP | 7-120816 | 12/1995 |

* cited by examiner

Primary Examiner—W. B. Perkey
(74) Attorney, Agent, or Firm—Sughrue Mion, PLLC

(57) ABSTRACT

When a stop aperture formed by a shutter blade has reached a diameter corresponding to a predetermined f-number, a flash light is emitted and an exposure is performed with the flash light. Successively, the diameter of the stop aperture is gradually increased. When the stop aperture has reached a diameter corresponding to a set f-number, a color-temperature conversion filter is placed at a photographic optical path. Another exposure is performed with an illumination light which has passed through the color-temperature conversion filter.

16 Claims, 13 Drawing Sheets

IMAGE PICKUP APPARATUS PROVIDED WITH A FLASH DEVICE

BACKGROUND OF THE INVENTION

1. Field of the Invention

The present invention relates to an image pickup apparatus provided with a flash device.

2. Description of the Related Art

In recent years, image pickup apparatuses are widely used. As the image pickup apparatus, for example, there are a photographic camera using a photographic (silver salt) film, and a digital still camera using a CCD image sensor or the like. Many of the image pickup apparatuses have a built-in flash device so as to be photographable under a circumstance lacking a light amount, for instance, under an indoor circumstance. As the photographic film used in the photographic camera, is most employed a color negative film of a daylight type for the purpose of taking a picture in the diurnal outdoors. The color negative film of this type is easily obtained. Further, in recent years, the color negative film has high sensitivity without deteriorating image quality thereof. The photographic film having high sensitivity of ISO 1600, for example, tends to be usually employed.

When flash photographing is performed by using the photographic camera under the dark circumstance, for instance, under the indoor circumstance, a proper exposure amount is obtained by a flash light relative to a main subject of a comparatively short distance, whereas there arises a problem in that the background, which is not affected by the flash light, becomes dark. Recently, however, the background is adapted to have a proper exposure amount in virtue of a clear taking lens, which has a small f-number and is easily used.

By the way, under the photographic circumstance using the flash light, an artificial light source is usually provided for illumination. As to a kind of the light source usually employed, there are a tungsten light source having low color temperature, a fluorescent lamp having a color of a light bulb, and so forth. Meanwhile, in the flash device of the camera, the color temperature of the flash light is set so as to obtain a proper color balance when the flash photographing is performed with the photographic film of the daylight type.

Owing to this, when the flash photographing is performed under the photographic circumstance of the room and so forth, a main subject of a comparatively short distance has an illumination effect of the flash light. Moreover, exposure is carried out mainly by the flash light so that the proper color balance is obtained relative to the main subject. However, with respect to the background which is not affected by the flash light, the exposure is carried out by the illumination light of the available light having low color temperature so that the color balance usually deteriorates.

When a color of the main subject is faithfully reproduced on a photo print produced from the photographic film exposed such as described above, the light-source color of the illumination light greatly remains on a background portion of the photo print so that an orange color is strongly applied thereto. Meanwhile, when the background is corrected in a printing process so as to faithfully reproduce the subject color, cyan is applied to the main subject. Consequently, as the whole of the taken picture, it is impossible to obtain a photo print having good color balance.

When the flash photographing is performed under the photographic circumstance such as described above, only way for improving the color balance of the whole picture is to reduce a color-temperature difference between the illumination light and the flash light. A professional photographer lowers the color temperature of the flash light by attaching a color-temperature conversion filter to a light-emitting surface of the flash device. It is known that there is a flash device automatically performing an operation substantially same with the function that the color-temperature conversion filter is attached to the light-emitting surface of the flash device (for example, Japanese Patent Laid-Open Publication No. 6-308586 and Japanese Patent Laid-Open Publication No. 7-120816).

However, in the method that the color-temperature conversion filter is attached to the flash device, a flash-light amount is reduced. Consequently, there is a disadvantage that an effective emission distance of the flash light is shortened. Moreover, in this method, the color temperature of the flash light is lowered so that it is required to use a photographic film of a tungsten type. This method is difficult to be adopted by a general amateur photographer and the laity.

In a case that the color-temperature conversion filter is attached to the flash device and the daylight-type photographic film is used, the proper color balance is not obtained for the whole picture. But, it is possible to produce a photo print having satisfactory color balance by correcting the color at the time of the printing process. In this case, however, if the color correction is automatically executed when producing the photo print from the exposed photographic film, the photo print is likely to be yellowish on the whole of the taken picture. This reason is that a printer can not automatically specify the main subject of a portrait and so forth. Hence, the printer can not execute the color correction so as to obtain the proper color balance. With respect to the picture taken in this way, it is impossible to produce the photo print having the satisfactory color balance unless the color correction is manually executed.

In another method for obtaining a picture of proper color balance by using the daylight-type photographic film, a color-temperature conversion filter is attached to a photographic optical system in addition to a flash device. The color-temperature conversion filter attached to the photographic optical system converts a color temperature of the tungsten light source into a color temperature of the daylight. Owing to this method, the photographic film is exposed in the proper color balance regarding both of the main subject and the background portion. Thus, it is possible to produce a photo print in which the main subject and the background are reproduced in suitable colors near to the impression colors. In this method, however, the flash light passes through both of the color-temperature conversion filters so that the light amount is lost in some degree corresponding to one or two steps of a stop, for example. Consequently, there arises a problem in that the effective emission distance of the flash light is extremely shortened.

SUMMARY OF THE INVENTION

In view of the foregoing, it is a primary object of the present invention to provide an image pickup apparatus in which a picture having proper color balance is obtained without increasing a light amount of a flash device, even if flash photographing is performed under a photographic circumstance illuminated by an artificial light source.

In order to achieve the above and other objects, the image pickup apparatus according to the present invention comprises a color-temperature conversion filter, which is movable between an insertion position and an evacuation position. The color-temperature conversion filter is placed at a photographic optical path when kept in the insertion position, and is evacuated from the photographic optical path when kept in the evacuation position.

During one-frame exposure, first and second exposures are performed. The first exposure is performed with a flash light in a state that the color-temperature conversion filter is moved to the evacuation position. The second exposure is performed without the flash light in a state that the color-temperature conversion filter is moved to the insertion position.

The image pickup apparatus according to the present invention further comprises a shutter device for opening and closing the photographic optical path. While the shutter device opens the photographic optical path one time, the first and second exposures are respectively performed. The shutter device is preferable to be a lens shutter.

In a preferred embodiment, the second exposure is performed after the first exposure. The color-temperature conversion filter raises a color temperature and satisfies a condition that color-temperature conversion ability Tb [mired] is −130 or less.

Moreover, the image pickup apparatus further comprises a color-temperature measure and a filter controller. The color-temperature measure detects a color temperature of an available light. In accordance with the detected color temperature, the filter controller prohibits the color-temperature conversion filter from moving to the insertion position when performing the second exposure. Alternatively, in accordance with the detected color temperature, the filter controller changes movement timing of the color-temperature conversion filter moving to the insertion position when performing the second exposure.

According to the present invention, both of a main subject and its background may be photographed in a proper color balance even if flash photographing is performed under a photographic circumstance illuminated by an illumination light having a color temperature, which is different from that of the flash light.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
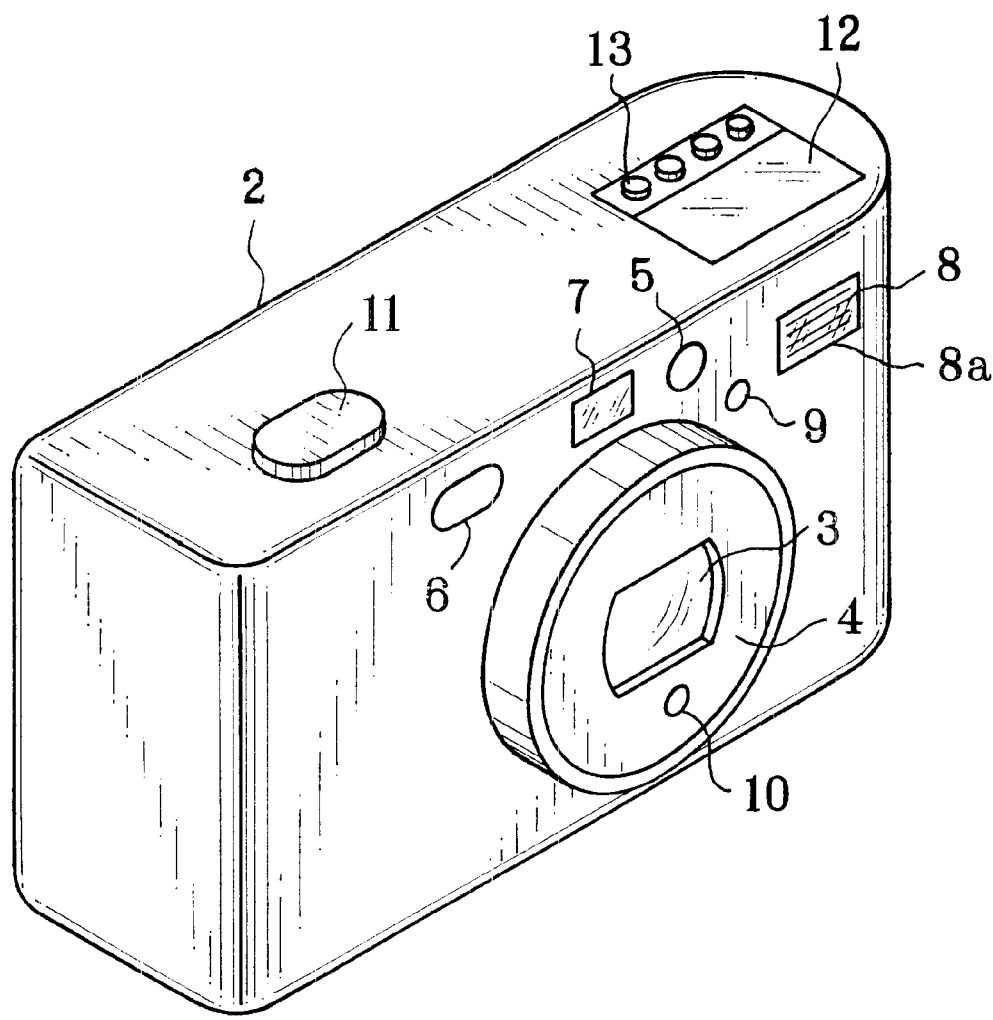
FIG. 1 is a perspective view showing a camera according to the present invention.

FIG. 1 shows the external appearance of a photographic camera (hereinafter camera) according to the present invention. This camera is adapted such that exposure is performed in proper color balance regarding both of a main subject and the background, even if flash photographing is performed by using a photographic film of a daylight type under illumination light, which has a low color temperature and is emitted from a tungsten light source for instance.

The front of a camera body 2 is provided with a lens barrel 4 holding a taking lens 3, light emitting and receiving windows 5 and 6 for measuring a distance, a viewfinder 7, a flash portion 8, and a light-regulation window 9. Moreover, the front of the lens barrel 4 is provided with a photometry window 10. The lens barrel 4 projects from a collapsible-mount position, which is shown in the drawing, to a photographing position upon turning on a main switch of the camera.

The top of the camera body 2 is provided with a release button 11, a liquid-crystal panel 12, and an operational portion 13. The liquid-crystal panel 12 displays a residual number of photographable frames and photographic information including setting information of a flash light. By operating the operational portion 13, it is possible to turn on and off the main switch and a self-timer, further it is also possible to select one of flash-light modes including a automatic flash mode, a compulsory flash mode, and a flash prohibition mode. In the automatic flash mode, the flash light is automatically emitted when subject brightness is low. In the compulsory flash mode, the flash light is emitted without regard to the subject brightness. In the flash prohibition mode, the flash light is prohibited.

In the flash photographing, an exposure value of the camera, namely a combination of an f-number and a shutter speed, is set so as to obtain a proper exposure amount relative to the dark background, for example. At the same time, with respect to the main subject of a comparatively short distance, the camera is controlled so as to obtain the proper exposure amount by emitting the flash light.

Further, in the flash photographing, two sorts of exposures are performed for a single picture to be taken by depressing the release button 11 one time. One sort of exposure is performed with the flash light in a state that a color-temperature conversion filter, which is described later, is evacuated from a photographic optical path. The other sort of exposure is performed without the flash light, namely is performed with an available light of an illumination light and so forth, in a state that the color-temperature conversion filter is placed at the photographic optical path. By doing so, the photographic film is exposed in the proper color balance regarding both of the main subject illuminated by the flash light, and the background illuminated by the illumination light having a low color temperature.

A light emitter for emitting a measurement light toward a subject is disposed behind the light emitting window 5. A light receiver for receiving the measurement light reflected by the subject is disposed behind the light receiving window 6. Moreover, a light-regulation sensor 14 (see FIG. 2) for receiving the flash light is disposed behind the light-regulation window 9. Further, a SPD (silicone photo diode) 15 (see FIG. 2) is disposed behind the photometry window 10 as a light receiving element for measuring the subject brightness.

Upon depressing the release button 11 by a half stroke, the measurement light of the light emitter is emitted from the light emitting window 5 toward the subject. The reflected measurement light is received by the light receiver through the light receiving window 6 to measure a photographic distance of the subject existing at a central portion of a picture to be taken, for example. Moreover, the SPD 15 measures the subject brightness through the photometry window 10 by means of averaged light metering. Successively, when the release button 11 is fully depressed, focusing of the taking lens 3 is performed in accordance with the measured photographic distance. After that, photographing is performed with the f-number and the shutter speed, which are based on the measured subject brightness and film sensitivity. Incidentally, at the time of flash photographing, the predetermined f-number $F_1$ is fixedly used, and the shutter speed is adjusted in accordance with the film sensitivity and the subject brightness.

The flash portion 8 comprises a diffusion plate 8a and a flash discharge tube (Xe tube) 16 (see FIG. 2) for radiating the flash light. The diffusion plate 8a diffuses the flash light in a predetermined radiation pattern, and the flash discharge tube 16 is disposed behind the diffusion plate. At the time of flash photographing, the flash light reflected by the subject is received by the light-regulation sensor 14 to integrate the light amount. When the integrated amount has reached a predetermined stop level, emission of the flash light is stopped. Owing to this, the exposure amount of the main subject obtained by the flash light is controlled so as to becomes a proper amount.

As to the flash light emitted from the flash portion 8, spectral characteristics thereof are determined so as to take a picture in proper color balance for the daylight-type photographic film. For instance, the color temperature of the flash light is 5500 K.

A lid (not shown) is attached to the bottom of the camera body 2 so as to be openable. By opening this lid, a film cartridge can be loaded. The film cartridge used in the camera is IX240-type of Advanced Photo System (APS), for example. The film cartridge of IX240-type is provided with a data disk on which film-sensitivity information and so forth are written in bar-code form. After the film cartridge has been loaded and the lid has been closed, a mechanism included in the camera reads a bar code of the data disk. The film sensitivity of the loaded photographic film is automatically set to the camera.

Figure 2:
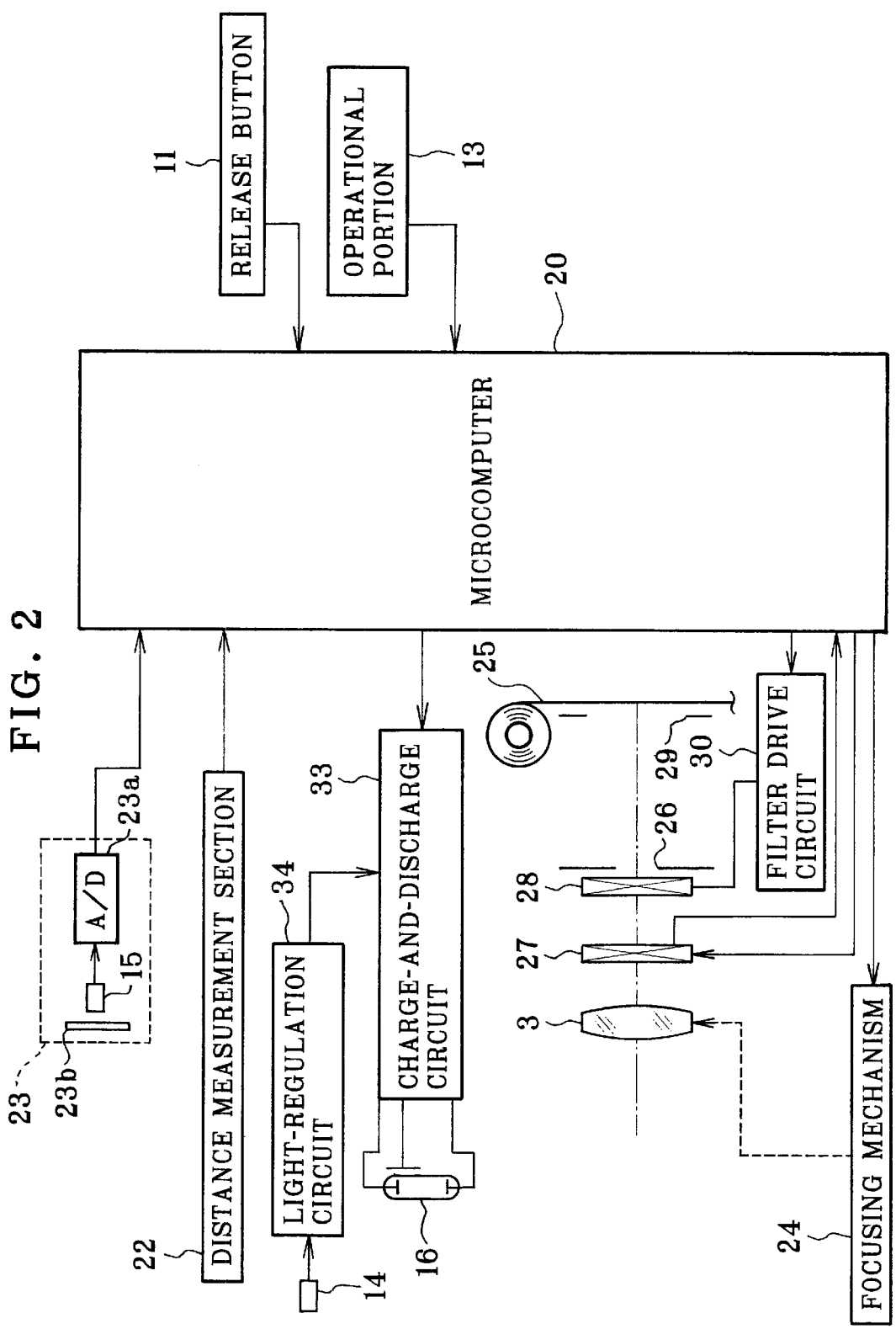
FIG. 2 is a block diagram partially showing a structure of the camera.

FIG. 2 shows a main structure of the camera. A microcomputer 20 executes various operations and control processes. For this purpose, the microcomputer 20 comprises a CPU, various interface circuits, a ROM, a RAM and so forth, which are unified as one chip. The ROM stores a program for photographing sequence, and in accordance with the stored program, each section of the camera is controlled. The RAM is used as a work memory. The microcomputer 20 is an exposure control member for controlling the respective sections so as to perform two sorts of exposures during one-frame (one-picture) exposure. One sort of exposure is performed with the flash light in a state that the color-temperature conversion filter is placed at an evacuation position. The other sort of exposure is performed with the available light in a state that the color-temperature conversion filter is placed at an insertion position.

Upon depressing the release button 11 by a half stroke, the microcomputer 20 activates a distance measurement section 22 and a photometry section 23. The distance measurement section 22 includes the light emitter and the light receiver, which are for measuring the distance and are described above. In addition to these, the distance measurement section 22 includes a drive circuit, an A–D converter and so forth. The drive circuit activates the light emitter and the A–D converter converts a signal obtained from the light receiver into photographic-distance information having digital form and corresponding to the photographic distance. The distance measurement section 22 transfers the photographic-distance information to the microcomputer 20.

The photometry section 23 includes the SPD 15, an A–D converter 23a, and a filter 23b disposed in front of the SPD 15. The filter 23b transmits only the visible light. The SPD 15 receives the light from the subject via the filter 23b, and passes a photocurrent in accordance with a strength of the received light, namely in accordance with the subject brightness. The A–D converter 23a digitally converts the photocurrent of the SPD 15. The converted photocurrent is transferred to the microcomputer 20 as subject-brightness information.

A focusing mechanism 24 is constituted of a motor for moving the taking lens 3, and a drive circuit thereof. The focusing mechanism 24 adjusts a projection amount of the taking lens 3 under the control of the microcomputer 20 so as to focus the taking lens 3 on the subject based on the photographic-distance information.

Behind the taking lens 3, a shutter opening 26 is provided to guide the photographic light from the taking lens 3 to a photographic film 25. A shutter device 27 and a filter device 28 are disposed between the shutter opening 26 and the taking lens 3.

The shutter device 27 is a lens shutter including a plurality of shutter blades, a drive mechanism, a signal outputting circuit and so forth. The shutter blade opens and closes the shutter opening 26, and is also used as a stop blade. The drive mechanism drives the shutter blade. The signal outputting circuit outputs various signals in accordance with an open state of the shutter blade. Incidentally, as the lens shutter, it is possible to adopt one of between the lens shutter, behind the lens shutter, and before the lens shutter. In this embodiment, the shutter blade is also used as the stop blade. By the way, a stop device may be separately provided.

The shutter device 27 usually closes the shutter opening 26 with the shutter blade in a light-tight state. When a shutter drive signal is inputted from the microcomputer 20 in response to the full depression of the release button 11, the shutter device 27 moves the respective shutter blades in an open direction to form a stop aperture in front of the shutter opening 26. A diameter of the stop aperture gradually increases. When the stop aperture reaches a diameter corresponding to a set f-number, the diameter of the current stop aperture is kept for a period corresponding to a set shutter speed. After that, the respective shutter blades are moved in a closed direction, which is an opposite direction to the open direction, to close the shutter opening 26 by gradually decreasing the diameter of the stop aperture.

The photographic light from the taking lens 3 passes the stop aperture formed by the shutter device 27. Further, the photographic light passes the shutter opening 26 and an exposure aperture 29, which defines an exposure area of the photographic film 25, to expose the photographic film 25.

The f-number and the shutter speed are determined by the microcomputer 20 on the basis of the subject brightness and the film sensitivity of the photographic film 25. After that, the f-number and the shutter speed are set to the shutter device 27. In the flash photographing, the f-number $F_1$ is fixedly used as described above, and the shutter speed is determined on the basis of the film sensitivity and the subject (background) brightness.

The shutter device 27 generates a synchro signal for emitting the flash light when the stop aperture has reached a diameter corresponding to a predetermined f-number $F_2$ on the way to moving the shutter blades in the open direction. Moreover, the shutter device 27 generates a timing signal for actuating the filter device when the stop aperture has reached the diameter corresponding to the f-number $F_1$. The synchro signal and the timing signal are sent to the microcomputer 20. Incidentally, the f-number $F_1$ is set so as to be smaller than the f-number $F_2$. For instance, the f-number $F_1$ is "F4" and the f-number $F_2$ is "F8".

The filter device 28 is driven by a filter drive circuit 30 controlled by the microcomputer 20. In the case that the flash light is emitted, the microcomputer 20 sends the timing signal of the shutter device 27 to the filter drive circuit 30. Upon receiving the timing signal, the filter drive circuit 30 actuates the filter device 28 to place the color-temperature conversion filter at the photographic optical path.

The flash device includes a charge-and-discharge circuit 33 and a light-regulation circuit 34 besides the light-regulation sensor 14, which is disposed behind the light-regulation window 9, and the flash discharge tube 16 disposed in the flash portion 8. The charge-and-discharge circuit 33 charges a main capacitor (not shown) up to a predetermined level when the main switch of the camera is turned on. In the case that the flash light is emitted, the synchro signal of the shutter device 27 is inputted into the charge-and-discharge circuit 33 via the microcomputer 20. Upon inputting the synchro signal, the charge-and-discharge circuit 33 applies a trigger voltage on the flash discharge tube 16 to start the emission of the flash light by discharging an electric charge of the main capacitor in the flash discharge tube 16.

The light-regulation sensor 14 receives the flash light reflected by the subject during the emission of the flash light. The photocurrent flows in accordance with the received light amount. On the basis of the photocurrent flowing from the light-regulation sensor 14, the light-regulation circuit 34 integrates the light amount of the flash light received by the light-regulation sensor 14. When the integrated amount has reached the predetermined stop level, the charge-and-discharge circuit 33 is controlled to stop the flash light. The stop level for stopping the flash light is determined on the basis of the f-number $F_2$ and the film sensitivity such that the exposure amount of the main subject becomes a proper amount by the flash light.

In the above-described flash device, for the purpose of deepening a depth of field, the flash light is emitted when the stop aperture has reached the diameter corresponding to the f-number $F_2$, which is more closed down than the f-number $F_1$. However, if it is desired to elongate the effective emission distance of the flash light, the flash light may be emitted at the timing of the f-number $F_1$.

Figure 3:
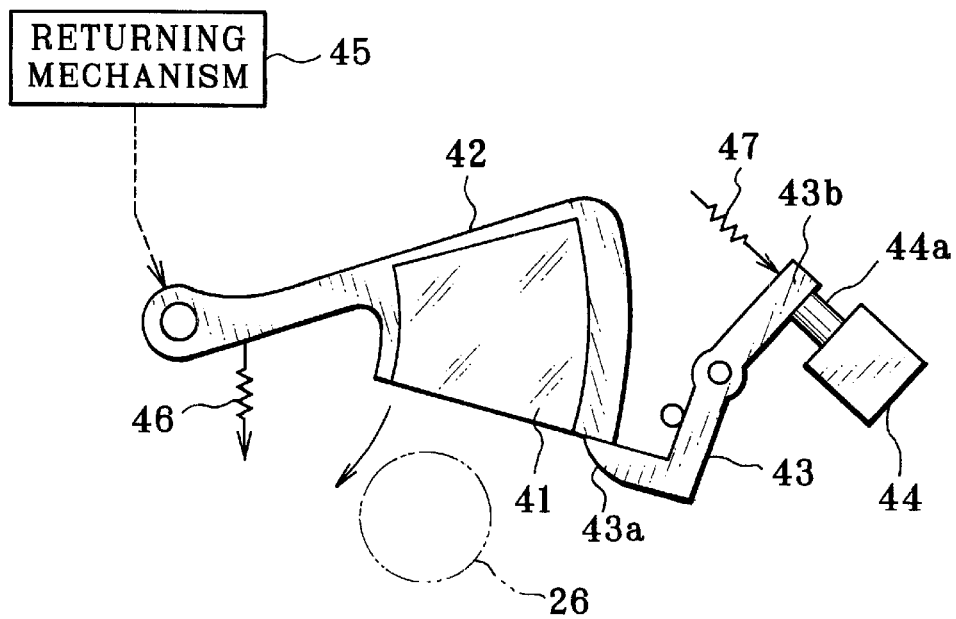
FIG. 3 is an explanatory illustration showing a state in that a color-temperature conversion filter is evacuated from a photographic optical path.
Figure 4:
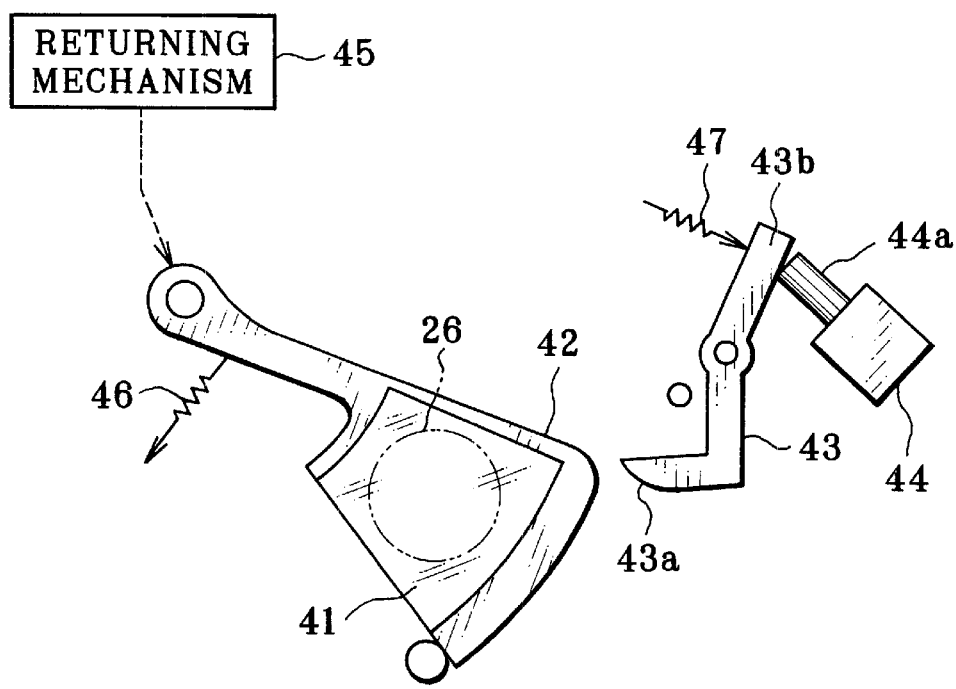
FIG. 4 is an explanatory illustration showing a state in that the color-temperature conversion filter is placed at the photographic optical path.

FIGS. 3 and 4 show an example of the filter device 28. FIG. 3 shows a state in that the color-temperature conversion filter is not placed at the photographic optical path. FIG. 4 shows a state in that the color-temperature conversion filter is placed at the photographic optical path. The filter device 28 is constituted of a rotational member 42 holding the color-temperature conversion filter 41, a lock lever 43, an actuator 44, a returning mechanism 45 and so forth.

The rotational member 42 is rotatable between an evacuation position and an insertion position respectively shown in FIGS. 3 and 4. At the evacuation position, the color-temperature conversion filter 41 is evacuated from the front of the shutter opening 26, namely from the photographic optical path. In contrast, at the insertion position, the color-temperature conversion filter 41 is placed at the photographic optical path.

The lock lever 43 is rotatable between a lock position and a release position respectively shown in FIGS. 3 and 4. At the lock position, one end 43a of the lock lever 43 enters a movement area of the rotational member 42 to engage with an edge of the rotational member 42. At the release position, the end 43a of the lock lever 43 is out of the movement area of the rotational member 42 to release the engagement of the end 43a and the rotational member 42. The lock lever 43 is urged by a spring 47 toward the lock position.

Upon inputting the filter drive signal, the actuator 44 presses the other end 43b of the lock lever 43 with a rod 44a against the spring 47 to rotate the lock lever 43 from the lock position to the release position. The filter drive signal is sent from the filter drive circuit 30 to the actuator 44 at the moment that the timing signal has been inputted into the filter drive circuit 30.

The rotational member 42 is usually kept in the evacuation position by the lock lever 43. In this state, upon rotating the lock lever 43 to the release position by means of the actuator 44, the engagement of the rotational member 42 and the lock lever 43 is released. At the moment that the stop aperture formed by the shutter device 27 has reached the diameter corresponding to the f-number $F_1$, the lock of the rotational member 42 is released so that the rotational member 42 is simultaneously rotated from the evacuation position to the insertion position by means of the spring 46. Thus, the color-temperature conversion filter 41 is placed at the photographic optical path.

The returning mechanism 45 is actuated by the filter drive circuit 30 after completing one-frame photographing. The returning mechanism 45 rotates the rotational member 42 from the insertion position to the evacuation position. When the rotational member 42 is rotated to the evacuation position, the lock lever 43 is released from being pressed by the actuator 44 so that the rotational member 42 is kept in the evacuation position.

In this embodiment, the color-temperature conversion filter 41 is moved in front of the shutter opening 26. The color-temperature conversion filter 41 may be moved at any position of the photographic optical path between the front of the taking lens 3 and the photographic film 25. However, in consideration of a size of the color-temperature conversion filter 41 and a time required for movement thereof, it is preferable to move the color-temperature conversion filter 41 at the position where luminous flux of the photographic light is thinly closed down.

Figure 5:
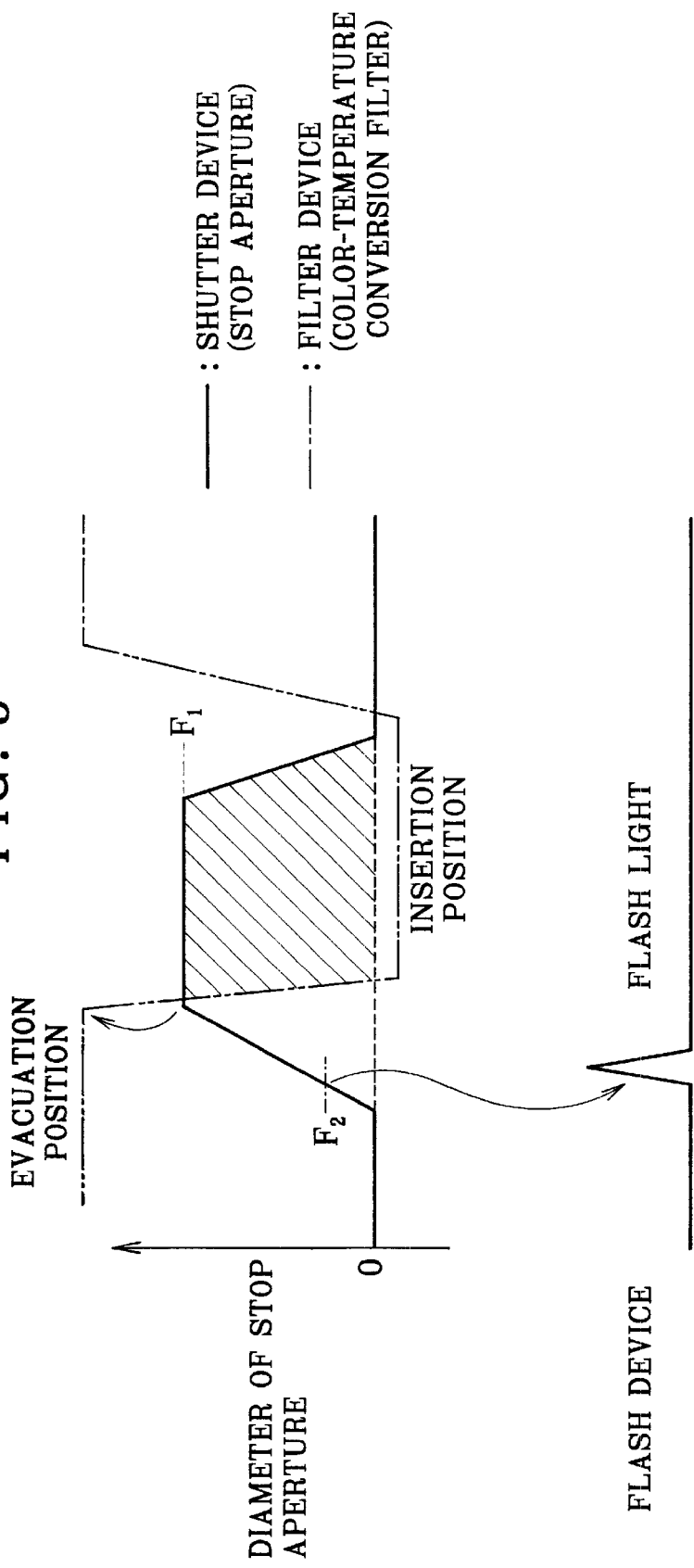
FIG. 5 is a graph showing operational timing of a shutter device, a filter device, and a flash device.

FIG. 5 is a graph showing operational timing of each of the shutter device 27, the filter device 28 and the flash device. The shutter device 27 moves the shutter blade in the open direction in response to the full depression of the release button 11 so that the diameter of the stop aperture gradually increases up to the diameter corresponding to the f-number $F_1$. On the way to increasing the diameter of the stop aperture, the flash light is emitted when the stop aperture has reached the diameter corresponding to the f-number $F_2$. At this time, the exposure is performed with the flash light in the state that the color-temperature conversion filter 41 is not placed at the photographic optical path.

When the stop aperture reaches the diameter corresponding to the f-number $F_1$ after completion of the flash light, the rotational member 42 is rotated from the evacuation position to the insertion position so that the color-temperature conversion filter 41 is placed at the photographic optical path. After passage of time corresponding to the shutter speed, the shutter device 27 closes the shutter opening 26 by gradually decreasing the diameter of the stop aperture. In this way, after flash photographing, the exposure is performed by the available light, without the flash light, in the state that the color-temperature conversion filter 41 is placed at the photographic optical path.

In this embodiment, the color-temperature conversion filter 41 is placed at the photographic optical path in response to the stop aperture having the diameter corresponding to the f-number $F_1$. However, since a response time for starting the rotation of the rotational member 42 is extremely longer than an emission period of the flash light, an operation for placing the color-temperature conversion filter 41 at the photographic optical path may be performed in response to the synchro signal for emitting the flash light. In this case, the color-temperature conversion filter 41 is adapted to be placed at the photographic optical path just after completion of the flash light.

The color-temperature conversion filter 41 to be used is required to have color-temperature conversion ability Tb for converting the illumination light (light source to be exact) from low color temperature to high color temperature. Concretely, it is preferable to use the color-temperature conversion filter 41 of "−130" mired or less (Tb≦−130).

Meanwhile, when the shutter blade is opened and the color-temperature conversion filter 41 is placed such as shown in FIG. 5, the whole exposure amount of the photographic film 25 corresponds to an area surrounded by a solid line and a broken line in FIG. 5. The solid line represents a change of the stop-aperture diameter, and the broken line is drawn for explanation. Further, the exposure amount obtained via the color-temperature conversion filter 41 corresponds to an area shown by hatching in FIG. 5. The exposure is performed by the illumination light also in the state that the color-temperature conversion filter is not inserted.

Therefore, the exposure is adapted not to be performed for the photographic film 25 in a state that the whole photographic light of the background passes through the color-temperature conversion filter 41. A part of the photographic light does not pass the color-temperature conversion filter 41 to perform the exposure. Thus, for the photographic film 25, the actual conversion ability of the color-temperature conversion filter 41 against the illumination light illuminating the background becomes smaller than nominal ability thereof. This means that the color-temperature conversion ability Tb having nominal ability of "−130" mired sometimes becomes about "−100" mired in practice when an operation speed of the lens shutter is low. In view of this, when this kind of the lens shutter is used, it is preferable to determine the mired value in consideration of the fact that the conversion ability becomes small.

The above problem is hardly caused in the high-speed shutter device in which the shutter blade is moved from a closed position, where the shutter opening is entirely closed, to an open position of the f-number $F_1$, where the shutter opening is fully opened, within a period of 5 msec or less. In the case of the high-speed shutter device, the conversion ability of the color-temperature conversion filter itself may be exercised. The shutter device 27 used in this embodiment takes 4 msec to move the shutter blade from the closed position to the open position. Thus, the nominal conversion ability of the color-temperature conversion filter 41 is substantially similar to the actual conversion ability thereof.

Figure 6:
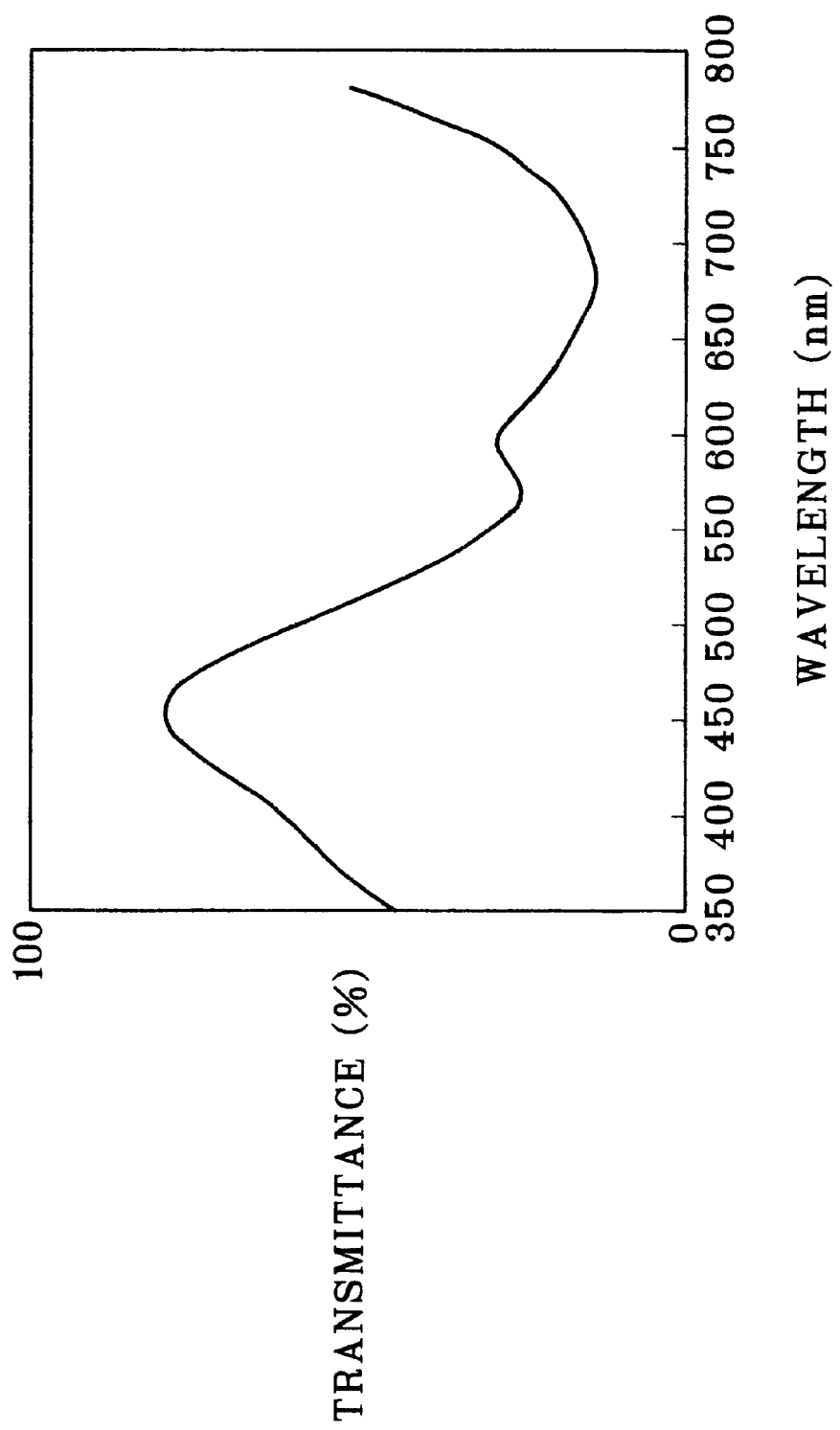
FIG. 6 is a graph showing an example of spectral characteristics of the color-temperature conversion filter.

In the case that the filter is inserted such as shown in FIG. 5, it is preferable to use the filter having the color-temperature conversion ability Tb of "−160" mired to "−200" mired. FIG. 6 shows an example of spectral characteristics of the color-temperature conversion filter 41 having the preferable conversion ability. The conversion ability Tb of the color-temperature conversion filter 41 shown in FIG. 6 is "−170" mired. For instance, the color temperature 2850K (about 350 mired) is converted into the color temperature 5500K (about 180 mired).

Next, an operation of the above structure is described below. The camera is loaded with the photographic film of the daylight type even when a picture is taken in a comparatively dark room or the like where the tungsten light source is used as the lighting apparatus, for example. If necessary, the flash-light mode is selected. In this case, the compulsory flash mode is selected to emit the flash light.

A photographer determines a framing through the viewfinder 7 and depresses the release button 11. For instance, the framing is determined such that a main subject of a comparatively-short distance is arranged at a central portion of a picture to be taken. And then, the release button 11 is depressed. Upon half depression of the release button 11, the distance measurement section 22 and the photometry section 23 are activated to measure the photographic distance of the main subject and the subject brightness of the whole picture to be taken. The information concerning the photographic distance and the subject brightness are transferred to the microcomputer 20.

The microcomputer 20 obtains the exposure value from the measured subject distance and the film sensitivity. Successively, the microcomputer 20 determines the shutter speed such that the combination of the f-number $F_1$ and the shutter speed corresponds to the obtained exposure value, since the compulsory flash mode is selected. The shutter speed and the f-number $F_1$ are set to the shutter device 27. Incidentally, the light amount entering the photographic film 25 is somewhat reduced by insertion of the color-temperature conversion filter 41. In consideration of the light amount to be reduced, the exposure value may be corrected.

After setting the f-number and the shutter speed to the shutter device 27, the microcomputer 20 waits until the release button 11 is fully depressed. Upon full depression of the release button 11, the microcomputer 20 drives the focusing mechanism 24 on the basis of the information concerning the photographic distance to focus the taking lens 3 on the main subject. After that, the microcomputer 20 sends the shutter drive signal to the shutter device 27. In response to the shutter drive signal, the shutter device 27 moves the shutter blade in the open direction.

The shutter blade is moved in the open direction, and the stop aperture reaches the diameter corresponding to the f-number $F_2$. At this moment, the synchro signal from the shutter device 27 is sent to the charge-and-discharge circuit 33 of the flash device via the microcomputer 20. Owing to this, the flash discharge tube 16 starts to emit the flash light so that the flash light having the color temperature of 5500K is radiated from the flash portion 8 toward the subject.

During the emission of the flash light, a part of the flash light reflected by the main subject enters the photographic film from the taking lens 3 via the stop aperture, the shutter opening 26 and the exposure aperture 29. Thus, at this time, the main subject is photographed with the flash light in the proper color balance.

Another part of the reflected flash light is received by the light-regulation sensor 14 through the light-regulation window 9. On the basis of the photocurrent flowing from the light-regulation sensor 14, the light amount is integrated by the light-regulation circuit 34. When the integrated amount has reached the stop level determined from the film sensitivity and the f-number $F_2$, the flash light is simultaneously stopped. At this time, the period for emitting the flash light is extremely short so that the diameter of the stop aperture hardly changes during the emission of the flash light. With respect to the main subject, the photographic film 25 is exposed with the illumination light in addition to the flash light so that the flash-light amount may be adjusted in consideration of the exposure performed by the illumination light.

After the emission of the flash light, the shutter blade continues to move in the open direction. When the stop aperture reaches the diameter corresponding to the f-number $F_1$, movement of the shutter blade in the open direction is stopped, and the stop is kept at the f-number $F_1$.

When the stop aperture has reached the diameter corresponding to the f-number $F_1$, the timing signal is simultaneously sent from the shutter device 27 to the filter drive circuit 30 via the microcomputer 20. Upon this, the filter drive circuit 30 triggers the actuator 44 of the filter device 28 to rotate the lock lever 43 to the release position. Thus, the engagement of the lock lever 43 and the rotational member 42 is released so that the rotational member 42 is rotated from the evacuation position to the insertion position by means of the spring 46.

When the rotational member 42 is rotated to the insertion position, the color-temperature conversion filter 41 is placed at the photographic optical path. From now on, the photographic light, which is the illumination light reflected by the subject and having entered the taking lens 3, passes through the color-temperature conversion filter 41 to expose the photographic film 25.

After the passage of time corresponding to the set shutter speed, the shutter blade starts to move in the closed direction for closing the shutter opening 26. In this way, the one-frame exposure is completed. After closing the shutter opening 26, the rotational member 42 is returned from the insertion position to the evacuation position by the returning mechanism 45. By releasing the lock lever 43 from being pushed by the actuator 44, the rotational member 42 is kept in the evacuation position.

As described above, the main subject is photographed with the flash light and without using the color-temperature conversion filter 41, and most of the background is photographed with the illumination light of the low color temperature by using the color-temperature conversion filter 41. As a result, photographing is substantially performed on condition that the color temperature of the illumination light of the background is converted so as to be similar to the color temperature of the flash light. Thus, the photographic film 25 is exposed in the proper color balance regarding both of the main subject having the lighting effect of the flash light and the background portion illuminated by the illumination light of the low color temperature. Hence, it is possible to obtain a photo print having proper color balance.

Figure 7:
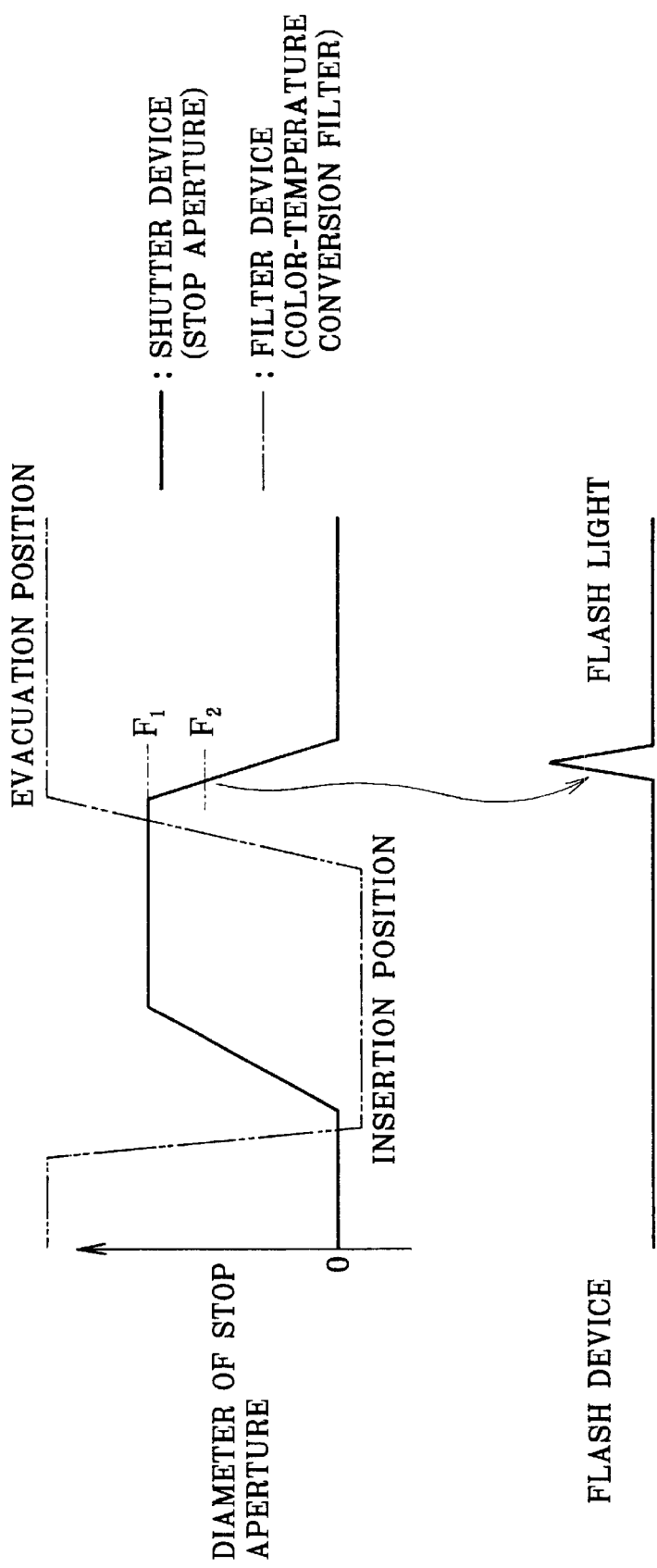
FIG. 7 is a graph showing an embodiment in that exposure is performed on condition that the color-temperature conversion filter is inserted prior to flash-light emission.

In the above embodiment, the shutter blade gradually increases the diameter of the stop aperture, and the flash light is emitted on the way to increasing the diameter of the stop aperture. After the emission of the flash light, the color-temperature conversion filter 41 is placed at the photographic optical path. However, such as shown in FIG. 7, the flash light may be emitted on the way to decreasing the diameter of the stop aperture. In this case, as shown in FIG. 7, the exposure is started in an initial state that the rotational member 42 is placed at the insertion position, namely the color-temperature conversion filter 41 is placed in front of the shutter opening 26. Just before decreasing the diameter of the stop aperture, the rotational member 42 is rotated from the insertion position to the evacuation position. On the way to decreasing the diameter of the stop aperture, the flash light is emitted in a state that the color-temperature conversion filter 41 is completely evacuated from the photographic optical path.

In the above embodiments, the shutter device opens the photographic optical path one time during the one-frame exposure. While the shutter device opens the optical path, the exposure is performed with the flash light in the state that the color-temperature conversion filter 41 is not placed at the optical path, further, the exposure is performed without the flash light in the state that the color-temperature conversion filter 41 is placed at the optical path. However, each exposure may be performed such as shown in FIG. 8.

Figure 8:
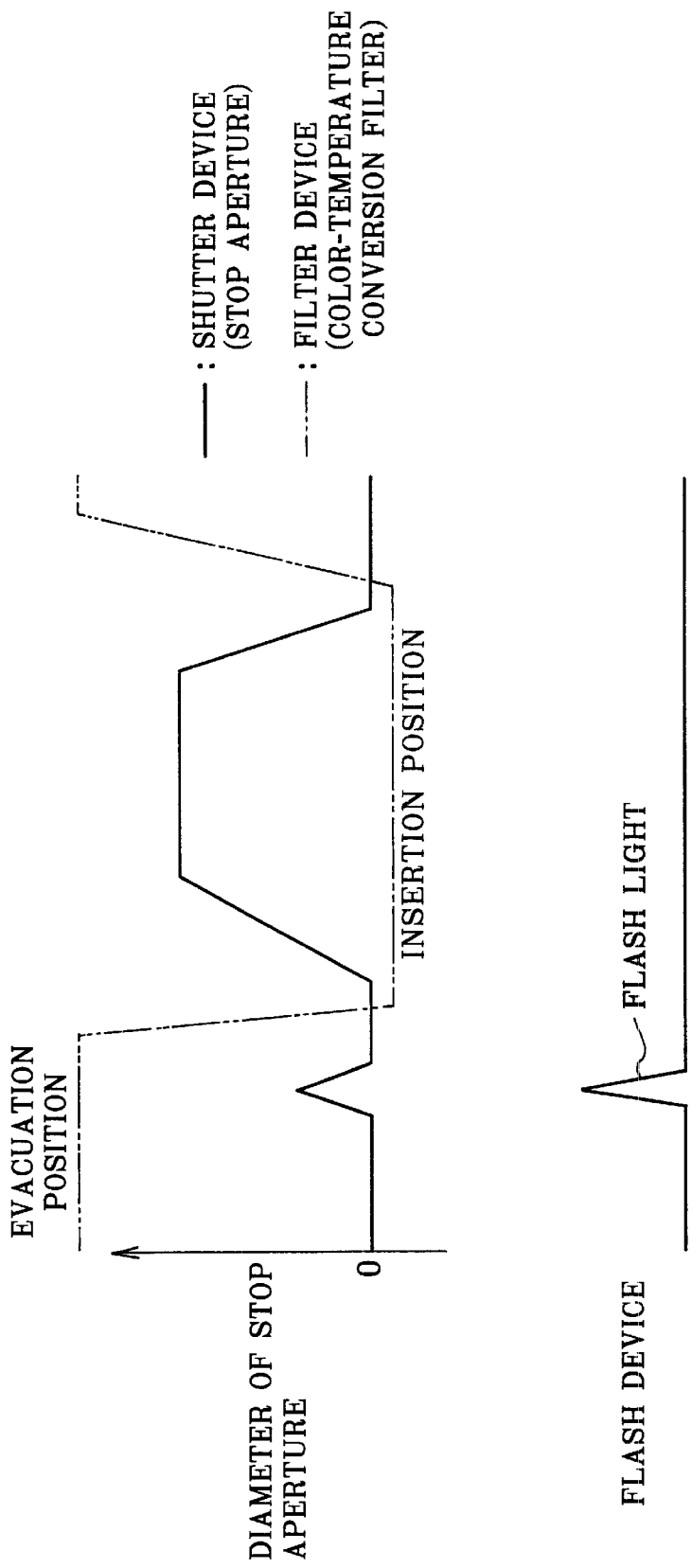
FIG. 8 is a graph showing an embodiment in that a shutter is opened two times.

In FIG. 8, the shutter blade is opened two times with respect to a single picture to be taken. During the first opening operation of the shutter blade, the exposure is performed with the flash light in the state that the color-temperature conversion filter 41 is not placed at the photographic optical path. During the second opening operation of the shutter blade, the exposure is performed with the available light, namely without the flash light, in the state that the color-temperature conversion filter 41 is placed at the photographic optical path. Order of the exposure is not exclusive.

When the shutter blade is opened two times such as shown in FIG. 8, it takes a long time for completing the photograph so that camera-movement blur and subject blur are likely to be caused. Thus, it is necessary to pay attention in this case. In view of the camera-movement blur and the subject blur, it is preferable to perform the two sorts of exposures while the shutter blade is opened one time, such as shown in the first embodiment and FIG. 7.

In the case shown in FIG. 7, after performing the exposure in the state that the color-temperature conversion filter 41 is inserted, the flash light is emitted in the state that the color-temperature conversion filter 41 is evacuated. In this case, a period from the commencement of the opening operation of the shutter blade to the evacuation of the color-temperature conversion filter 41 becomes long and it is difficult to set a reference point for evacuating the color-temperature conversion filter 41. Further, it is also difficult to improve accuracy of the exposure control. For these reasons, it is preferable to place and remove the color-temperature conversion filter 41 such as shown in the first embodiment.

In each of the above embodiments, at the time of flash photographing, the exposure is always performed in the state that the color-temperature conversion filter is inserted. It is not exclusive that the flash photographing is performed under the circumstance illuminated by the tungsten light source and the other light source having the color temperature corresponding thereto. In some cases, photographing is performed at the diurnal outdoors and under circumstances illuminated by a white fluorescent lamp and a mercury lamp. In such cases, a good result is sometimes obtained by performing the exposure without using the color-temperature conversion filter. It is preferable to perform the exposure in a state that the color-temperature conversion filter is inserted under the circumstances illuminated by the white fluorescent lamp and the mercury lamp, but is not inserted under the other circumstances.

Figure 9:
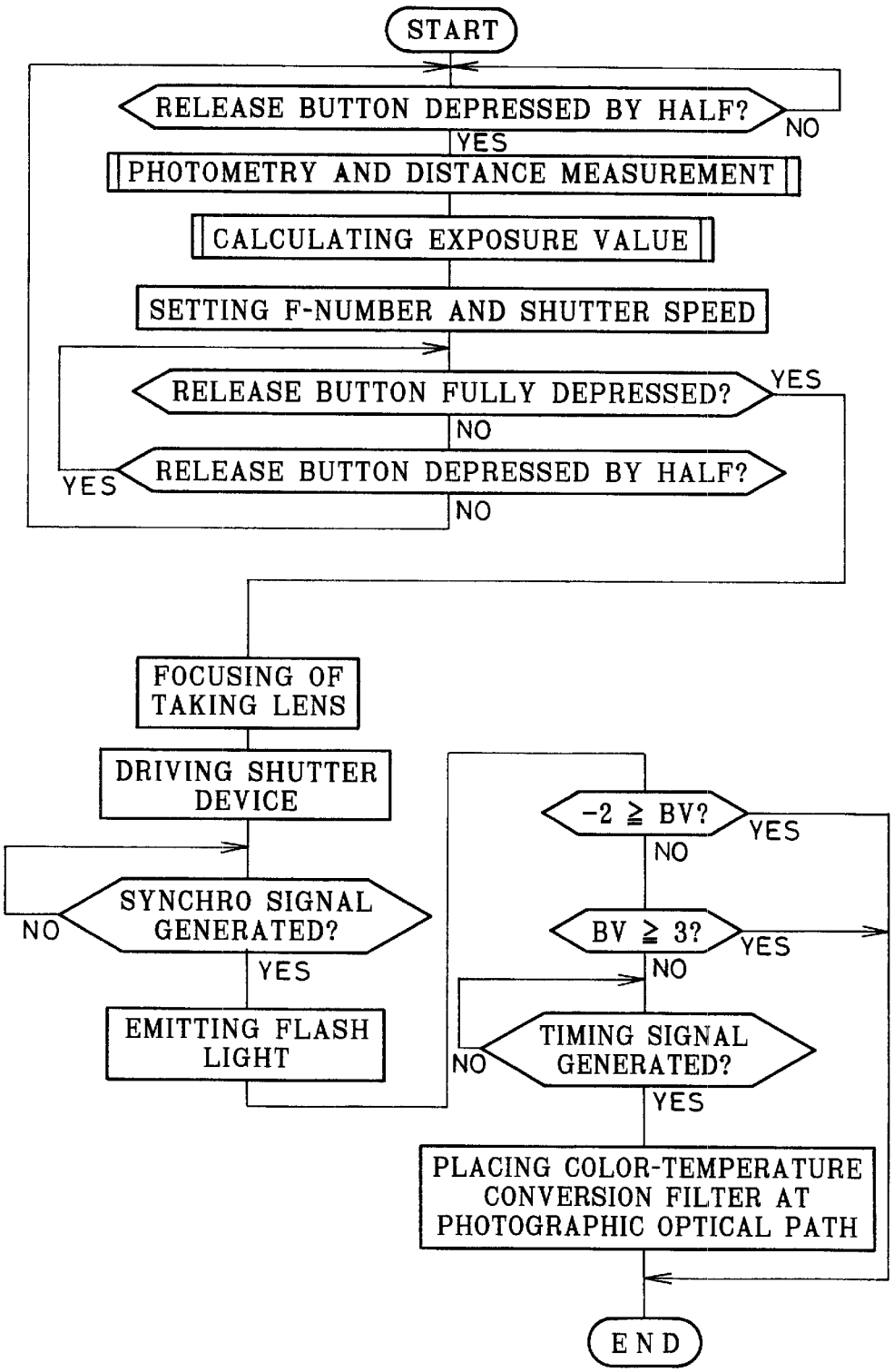
FIG. 9 is a flow chart showing an embodiment in that the color-temperature conversion filter is inserted in accordance with subject brightness.

FIG. 9 shows another embodiment in which insertion of the color-temperature conversion filter is determined in accordance with the subject brightness. Except the following description, this embodiment is similar to the first embodiment. The similar component is denoted by the same reference numeral and the detailed description thereof is omitted.

In this embodiment, the subject brightness measured by the SPD 15 is denoted by BV as an apex value. Only when the subject brightness BV is within a range of "−2<BV<3", the color-temperature conversion filter 41 is placed at the photographic optical path after the emission of the flash light. When the subject brightness is outside the above range, the color-temperature conversion filter 41 is prohibited to be placed at the photographic optical path so that the exposure is performed by the available light without using the color-temperature conversion filter 41 after the emission of the flash light.

According to examination made by the present inventors, an illumination-intensity range obtained by using the tungsten light was restricted to a comparatively narrow scope. Moreover, was obtained a result that the subject brightness BV was included within the range of "−2<BV<3" in probability of 99% or more. Therefore, even if the insertion of the color-temperature conversion filter 41 is changed in accordance with the subject brightness BV such as described above, the main subject and the background may be respectively photographed on the daylight-type photographic film 25 in the proper color balance under the most photographic circumstances. Incidentally, when the subject brightness BV is within the range of "−2<BV<3" and the fluorescent lamp is used for illumination, the color balance is adapted to slightly add a cyan blue to the background.

In the most proper method for determining the insertion of the color-temperature conversion filter, the color temperature of the light source illuminating the background is measured, and on the basis of a measurement result, the insertion of the filter is determined. In other words, the color-temperature conversion filter is inserted only when the color temperature of the light source illuminating the background is lower than a prescribed color temperature. The color-temperature conversion filter is controlled so as not to be inserted when the color temperature of the light source is higher than the prescribed color temperature.

Figure 10:
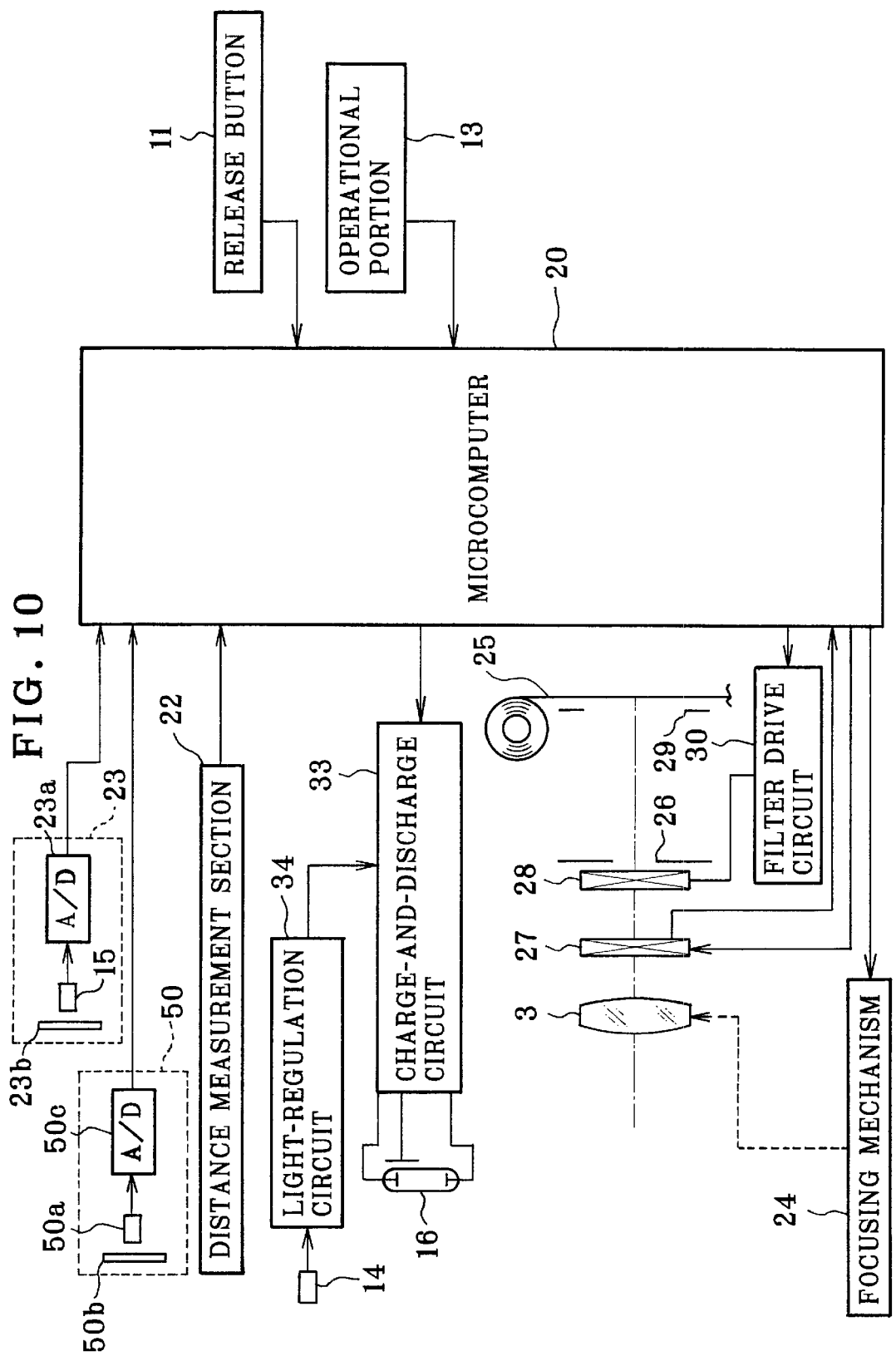
FIG. 10 is a block diagram showing an embodiment in that the color-temperature conversion filter is inserted in accordance with measured color temperature.
Figure 11:
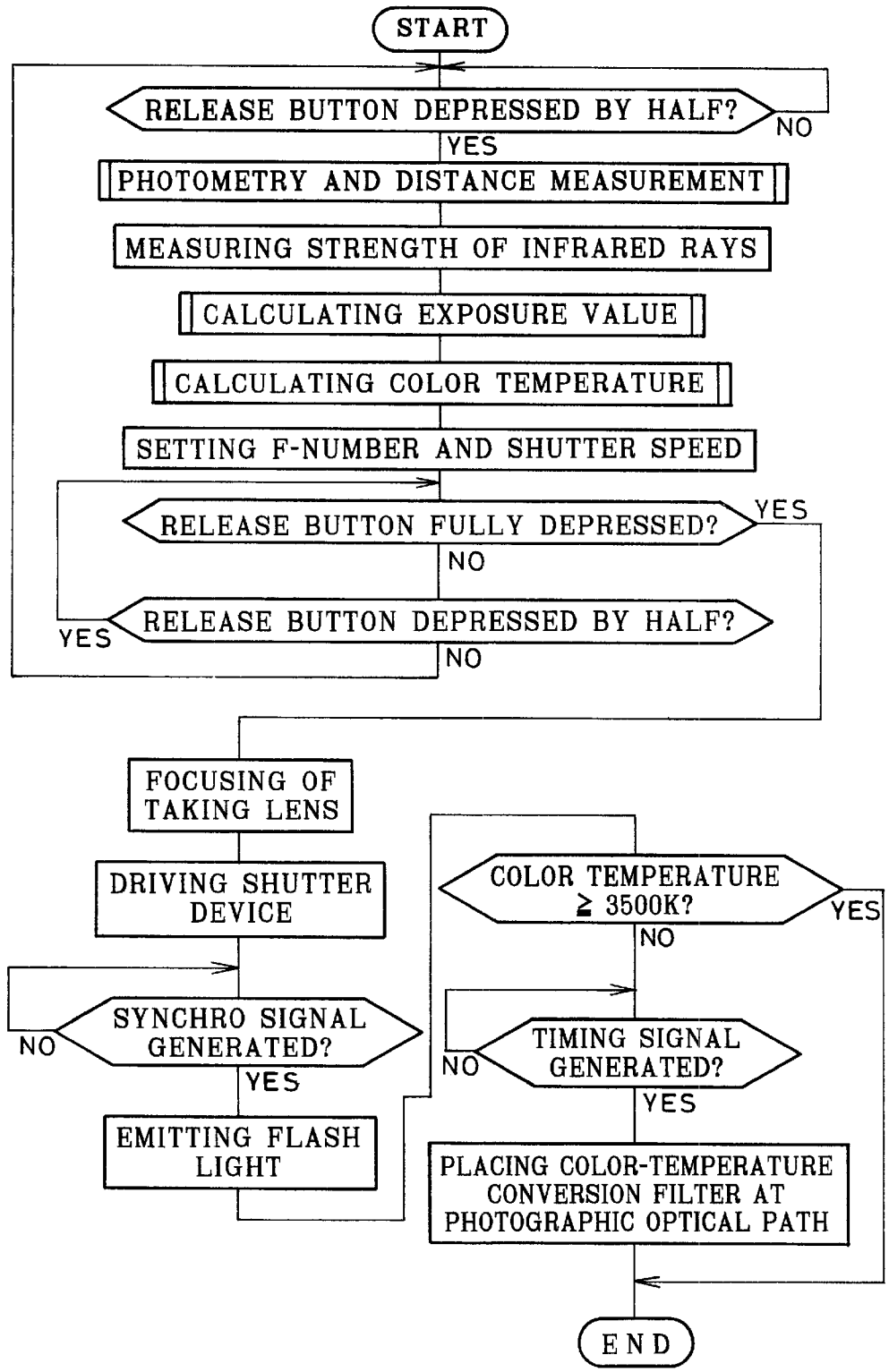
FIG. 11 is a flow chart showing a sequence of flash photographing.

FIGS. 10 and 11 show the other embodiment in which the color temperature of the light source illuminating the background is measured, and on the basis of the measurement result, the insertion of the color-temperature conversion filter is determined. Except the following description, this embodiment is similar to the first embodiment. The similar component is denoted by the same reference numeral and the detailed description thereof is omitted.

As shown in FIG. 10, an infrared-ray receiver 50 is provided in order to measure the color temperature of the light source illuminating the background. The infrared-ray receiver 50 is constituted of a light-receiving element 50a, an infrared-ray filter 50b, and an A–D converter 50c. The light-receiving element 50a, which is a SPD for instance, has light-receiving sensitivity relative to a wavelength range of the infrared rays. The infrared-ray filter 50b transmits only the infrared rays. The SPD 50a passes a photocurrent in accordance with a strength of the infrared rays of the subject light obtained via the infrared-ray filter 50b. The photocurrent is digitally converted by the A–D converter 50c and is transferred to the microcomputer 20 as information concerning the strength of the infrared rays.

On the basis of the infrared-ray strength information and the subject-brightness information transferred from the photometry section 23, the microcomputer 20 executes a predetermined operation to specify the color temperature of the light source illuminating the background. In other words, the microcomputer 20 specifies the color temperature of the light source from both of the visible-light strength obtained by the photometry section 23 and the infrared-ray strength obtained by the infrared-ray receiver 50.

The microcomputer 20 inserts the color-temperature conversion filter 41 after emitting the flash light only when the specified color temperature is less than 3500K. In this embodiment, a color-temperature measuring member is constituted of the photometry section 23, the infrared-ray receiver 50, and the microcomputer 20. The microcomputer 20 also works as a filter controlling member.

According to the above structure, as shown in FIG. 11, when the color temperature of the light source illuminating the background is less than 3500K, the exposure is performed with the flash light in the state that the color-temperature conversion filter 41 is not placed at the photographic optical path, and the exposure is performed with the available light in the state that the color-temperature conversion filter 41 is placed at the photographic optical path. In contrast, when the color temperature of the light source is 3500K or more, inserting the color-temperature conversion filter 41 is prohibited after the emission of the flash light so that the exposure is performed with the available light in the state that the color-temperature conversion filter 41 is not inserted. Owing to this, it is possible to take a picture in the substantially optimum color balance without regard to the color temperature of the light source.

For measuring the color temperature, two light receiving elements may be provided so as to receive the lights having different wavelengths. For instance, one of the light receiving elements has a red filter through which only the red light is transmitted. The other of the light receiving elements has a blue filter through which only the blue light is transmitted. The color temperature may be specified from a strength ratio of the respective color lights measured by the two light receiving elements. The method for measuring the color temperature is not exclusive to the above, but various methods may be adopted. The measurement of the color temperature does not require great accuracy. It is sufficient that the insertion of the color-temperature conversion filter 41 may be judged in a practical level.

Figure 12:
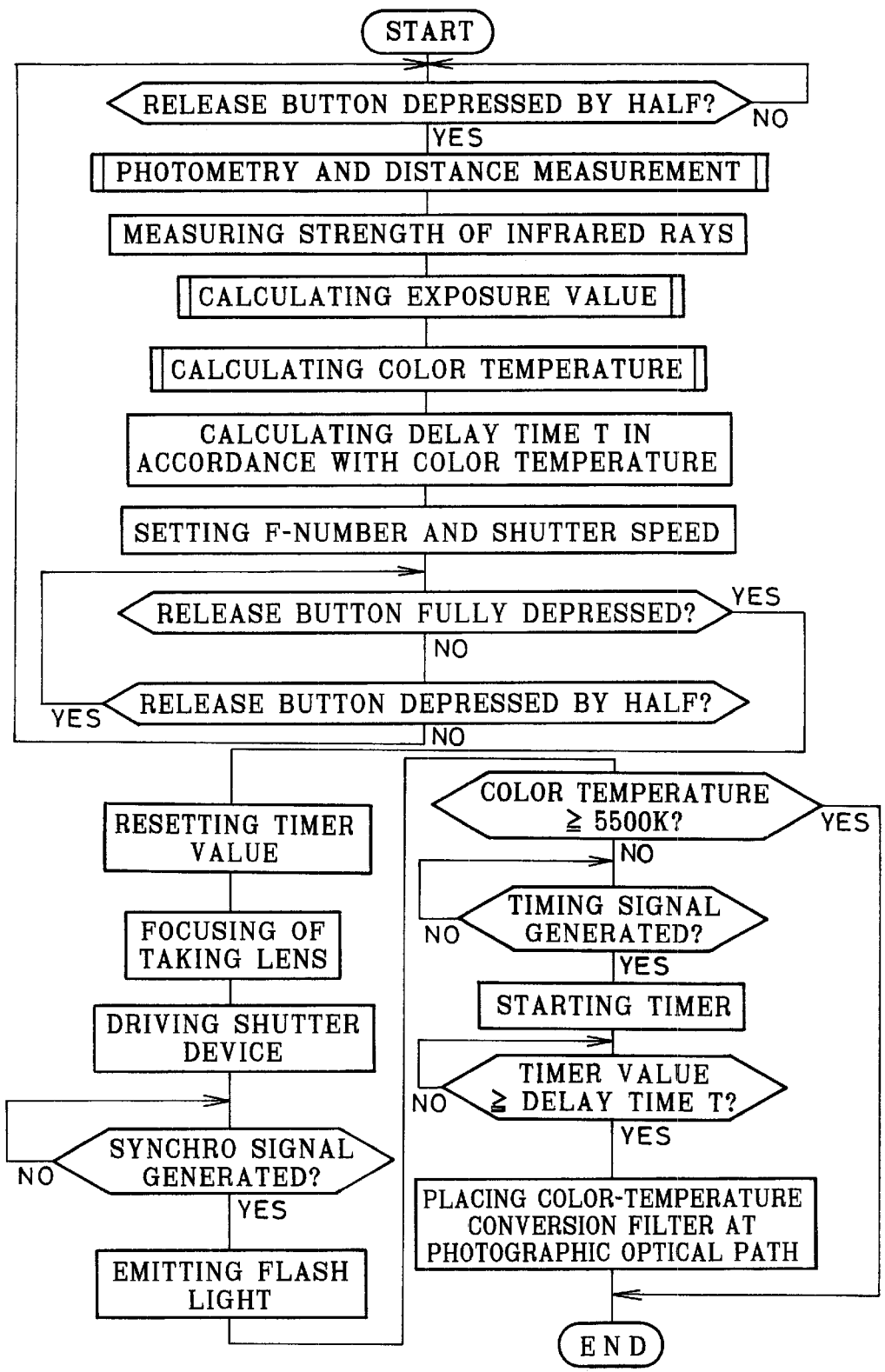
FIG. 12 is a flow chart showing an embodiment in that insertion timing of the color-temperature conversion filter is changed in accordance with the measured color temperature.

FIG. 12 shows the other embodiment in which insertion timing of the color-temperature conversion filter is changed in accordance with the measured color temperature. Except the following description, this embodiment is similar to that shown in FIG. 10. The similar component is denoted by the same reference numeral and the description thereof is omitted.

On the basis of the subject-brightness information of the photometry section 23 and the infrared-ray strength information of the infrared-ray receiver 50, the microcomputer 20 specifies the color temperature of the light source illuminating the background. Further, on the basis of the specified color temperature, a delay time T is determined. The microcomputer 20 has a built-in timer (not shown), which is reset in response to the full depression of the release button 11 and which starts clocking in response to the timing signal inputted from the shutter device 27. When a timer value counted by the timer reaches the delay time T, the microcomputer 20 drives the filter device 28 via the filter drive circuit 30.

Figure 13:
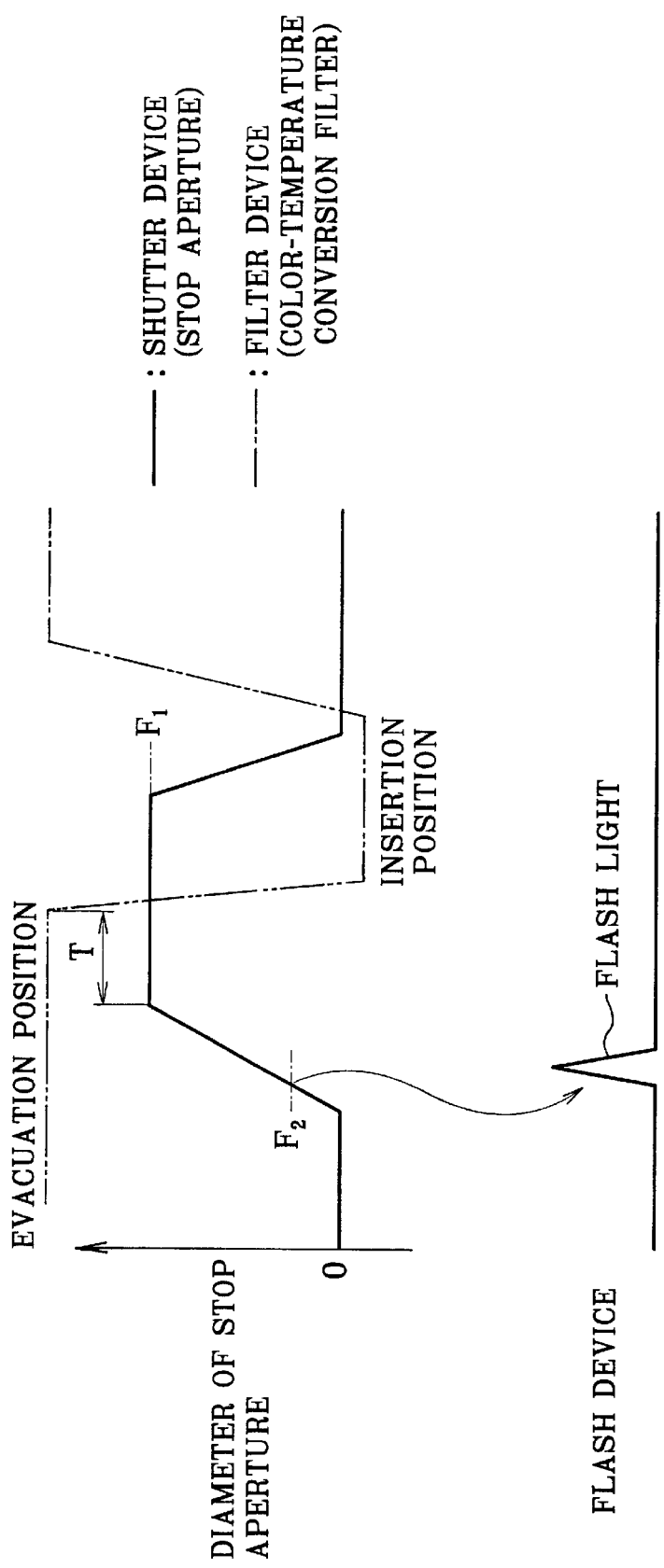
FIG. 13 is a graph explaining a delay time in FIG. 12.

Owing to this, such as shown in FIG. 13, the color-temperature conversion filter 41 is placed at the photographic optical path after the delay time T has passed from a point that the stop aperture formed by the shutter blade reaches the f-number $F_1$. Incidentally, when the color temperature of the light source illuminating the background is 5500K or more, the color-temperature conversion filter 41 is not inserted.

Figure 14:
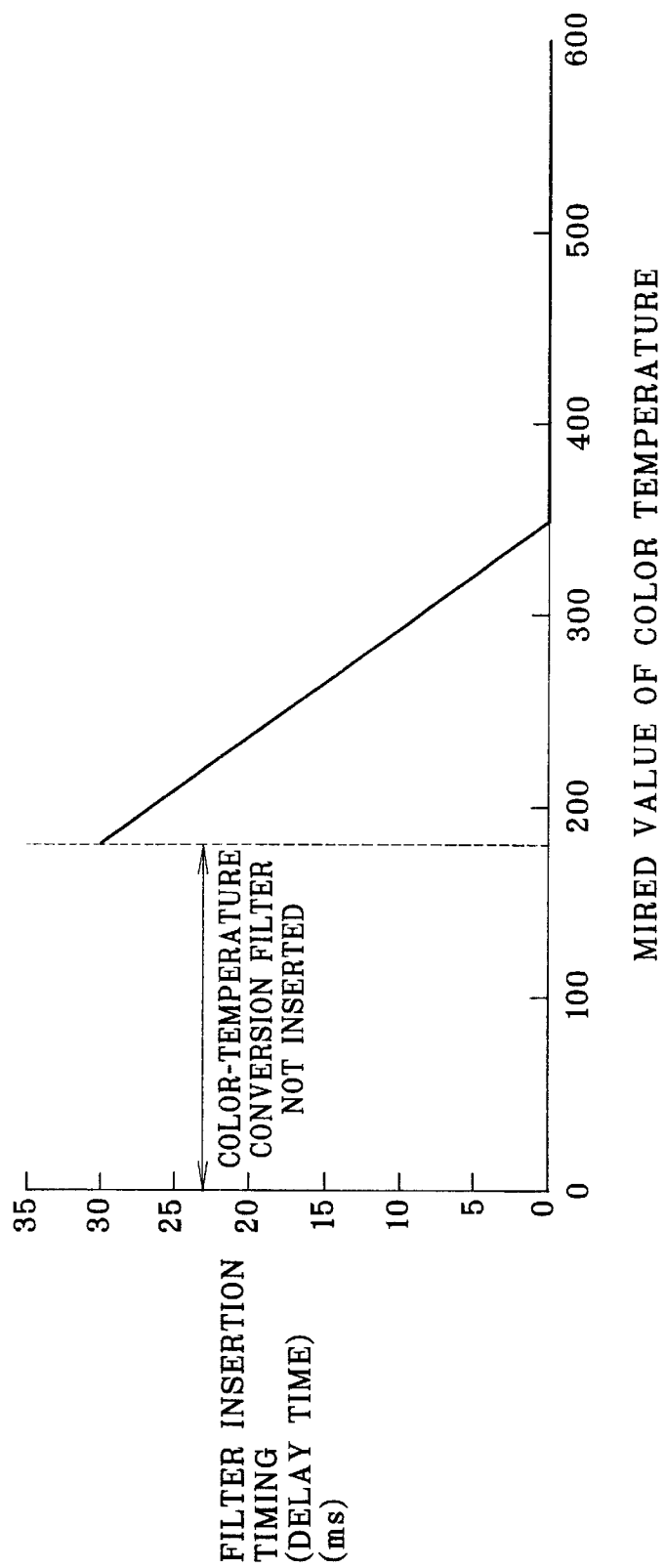
FIG. 14 is a graph showing an example of the delay time according to the color temperature.

FIG. 14 shows an example of the delay time T in a case that the shutter speed is "1/30 sec". In this case, is used the color-temperature conversion filter 41 having the color-temperature conversion ability of "−170" mired. The delay time T is determined such that the insertion timing to the photographic optical path becomes earlier as the color temperature of the light source is lower. In other words, the delay time T is determined so as to enhance the substantial conversion ability of the color-temperature conversion filter 41.

The delay time T is different in accordance with the shutter speed set in photographing, even if the color temperature of the light source illuminating the background is identical. By the way, in FIG. 14, a horizontal line represents a mired value of the color temperature of the light source.

In the above structure, when the color temperature of the light source illuminating the background is 2850K (about 350 mired), the delay time T is set to "0". Similarly to the first embodiment shown in FIG. 5, the color-temperature conversion filter 41 is placed at the photographic optical path just after the shutter opening formed by the shutter blade has reached the diameter corresponding to the f-number $F_1$. By doing so, the color temperature of the light source is converted from 2850K into 5500K.

When the color temperature of the light source is 3500K (about 285 mired), the delay time T is set to about 10 msec. A period for placing the color-temperature conversion filter 41 at the photographic optical path is shortened in comparison with the case in that the color temperature of the light source is 2850K. In this case, the color temperature of the light source is converted from 3500K into 5500K in a condition that the substantial conversion ability of the color-temperature conversion filter 41 is lowered. Owing to this, the color temperature is prevented from being overly corrected so that the color temperature is converted so as to obtain the proper color balance.

When the color temperature of the light source is 5500K (about 180 mired), the color balance is lost if the color-temperature conversion filter 41 is inserted. When the color temperature is higher than 5500K, or is lower than about 180 mired, a correction effect of keeping the proper color balance is not obtained even if the color-temperature conversion filter 41 is inserted. In view of this, when the color temperature of the light source illuminating the background is 5500K or more (about 180 mired or less), the color-temperature conversion filter 41 is not inserted such as described above.

When the color temperature of the light source is less than 2850K, the color temperature is converted so as to approach 5500K as near as possible by setting the delay time T to "0".

In this way, the delay time T, namely the insertion timing of the color-temperature conversion filter 41, is changed in accordance with the measured color temperature of the light source. By doing so, the proper color balance may be obtained relative to the light source having the color temperature of the prescribed range, which is the range of 2850K to 5500K in this embodiment. At the same time, dependence of a photographic scene may be reduced.

In the above embodiments, is used the flash device, which is the so-called auto flash and in which the flash light is controlled in accordance with the received amount of the reflected flash light. However, it is possible to use the so-called flashmatic in which the exposure amount of the flash light is adjusted by a size of the stop aperture when emitting the flash light.

Further, in the above embodiment, the camera using the photographic film is described as the image pickup apparatus. However, the present invention is also applicable to a digital still camera using an image sensor of a CCD image sensor and so forth. In the digital still camera, both of a mechanical shutter and an electronic shutter may be employed as the shutter device. The mechanical shutter controls the incident light of the image sensor. The electronic shutter adjusts a charge storage time of each light receiving element of the image sensor.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup apparatus for imaging a subject one frame by one frame, said image pickup apparatus including a flash device for emitting a flash light toward the subject, and an optical path along which a photographic light from the subject passes, said image pickup apparatus comprising:

a color-temperature conversion filter for converting a color temperature of the photographic light;

filter drive means for moving said color-temperature conversion filter between an evacuation position where said color-temperature conversion filter is placed at the outside of said optical path, and an insertion position where said color-temperature conversion filter is placed at said optical path; and exposure control means for performing a first exposure and a second exposure during an exposure period of said one frame, said first exposure being performed with the flash light in a state that said color-temperature conversion filter is moved to the evacuation position, and said second exposure being performed without the flash light in a state that said color-temperature conversion filter is moved to the insertion position.

2. An image pickup apparatus according to claim 1, further comprising:

a shutter device for opening and closing said optical path, said exposure control means performing said first exposure and said second exposure while said shutter device opens said optical path one time.

3. An image pickup apparatus according to claim 2, wherein said shutter device is a lens shutter.

4. An image pickup apparatus according to claim 2, wherein said exposure control means performs said second exposure after performing said first exposure.

5. An image pickup apparatus according to claim 1, wherein said color-temperature conversion filter raises said color temperature of the photographic light, and satisfies a condition of "−130≧Tb" when color-temperature conversion ability thereof is represented as Tb.

6. An image pickup apparatus according to claim 1, further comprising:
   color-temperature measurement means for measuring said color temperature; and
   filter control means for prohibiting said color-temperature conversion filter from moving to the insertion position, in accordance with the color temperature measured by said color-temperature measurement means.

7. An image pickup apparatus according to claim 6, wherein said color-temperature measurement means comprises:
   a light-receiving element having light-receiving sensitivity for a wavelength range of infrared rays;
   an infrared-ray filter disposed in front of said light-receiving element and for transmitting only the infrared rays; and
   an A–D converter connected to said light-receiving element, said A–D converter digitally converting a photocurrent flowing from said light-receiving element.

8. An image pickup apparatus according to claim 7, wherein said light-receiving element is a silicone photo diode.

9. An image pickup apparatus according to claim 8, wherein said filter control means prohibits said color-temperature conversion filter from moving to the insertion position when said measured color temperature is higher than a predetermined color temperature.

10. An image pickup apparatus according to claim 1, further comprising:
    color-temperature measurement means for measuring said color temperature; and
    filter control means for changing movement timing of said color-temperature conversion filter to the insertion position, in accordance with the color temperature measured by said color-temperature measurement means.

11. An image pickup apparatus according to claim 10, wherein said color-temperature measurement means comprises:
    a light-receiving element having light-receiving sensitivity for a wavelength range of infrared rays;
    an infrared-ray filter disposed in front of said light-receiving element and for transmitting only the infrared rays; and
    an A–D converter connected to said light-receiving element, said A–D converter digitally converting a photocurrent flowing from said light-receiving element.

12. An image pickup apparatus according to claim 11, wherein said light-receiving element is a silicone photo diode.

13. An image pickup apparatus according to claim 12, wherein said filter control means quickens said insertion timing of said color-temperature conversion filter as said measured color temperature is lower.

14. An image pickup apparatus according to claim 1, wherein said filter drive means comprises:
    a rotational member for holding said color-temperature conversion filter;
    a lock lever for engaging with said rotational member and for keeping said color-temperature conversion filter in the evacuation position; and
    an actuator for releasing engagement of said rotational member and said lock lever.

15. An image pickup apparatus according to claim 14, wherein said filter drive means further comprises:
    a first spring for urging said lock lever so as to engage with said rotational member, said actuator releasing the engagement of said rotational member and said lock lever by rotating said lock lever against said first spring; and
    a second spring for urging said rotational member so as to move said color-temperature conversion filter toward the insertion position after releasing the engagement of said rotational member and said lock lever.

16. An image pickup apparatus according to claim 15, further comprising:
    a returning mechanism for returning said color-temperature conversion filter from the insertion position to the evacuation position.

* * * * *